(No Model.)

D. McC. KITTLE.
FISHING APPARATUS.

No. 576,680. Patented Feb. 9, 1897.

WITNESSES
John Buckler,
E. Gerst.

INVENTOR
David McC. Kittle
BY
Edgar Yates
ATTORNEYS

UNITED STATES PATENT OFFICE.

DAVID McCARN KITTLE, OF SYRACUSE, NEW YORK.

FISHING APPARATUS.

SPECIFICATION forming part of Letters Patent No. 576,680, dated February 9, 1897.

Application filed June 30, 1896. Serial No. 597,529. (No model.)

*To all whom it may concern:*

Be it known that I, DAVID McCARN KITTLE, a citizen of the United States, and a resident of Syracuse, in the county of Onondaga and State of New York, have invented certain new and useful Improvements in Fishing Apparatus, of which the following is a specification, reference being had to the accompanying drawings, forming a part thereof, in which similar numerals of reference indicate corresponding parts wherever found in both views.

This invention relates to fishing apparatus, and particularly to what are known as "spoon-hooks;" and the object thereof is to provide an improved device of this class which is simple in construction and operation and which presents many advantages over ordinary devices of this class as now constructed.

The invention is fully disclosed in the following specification, of which the accompanying drawings form a part, in which—

Figure 1:
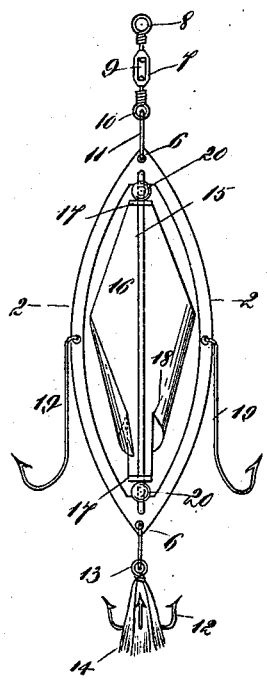
Figure 2:
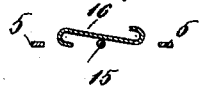

Figure 1 is a side view of my improved hook, and Fig. 2 a section thereof on the line 2 2.

In the practice of my invention I provide an elliptical frame 5, which consists of two curved side bars, which come together at their ends to form points 6, and pivotally connected with one of said points or ends is an attaching device 7, by means of which a line may be secured thereto, said attaching device consisting of a swiveled eye or ring 8, which is connected with a link 9, which is pivotally connected with a ring or eye 10, which is connected by means of a link 11 with the end of the frame 5, and the lower end of the frame 5 is provided with the usual hooks 12, two, three, or four of which may be employed, and said hooks are rigidly connected and provided with an eye or ring 13, by means of which they are connected with the frame 5, and the body portions or shanks of the hooks 12 are covered with feathers, as shown at 14.

Extending longitudinally through the frame 5 is a rod 15, which is rigidly connected with said frame, and revolubly mounted thereon is a diamond or elliptical shaped center piece 16, provided at its ends with angular shoulders or projections 17, through which the rod 15 passes, and the center piece 16 is wider at its lower end than at its upper end, and the sides thereof are cut away at an angle in the direction of the center thereof, as shown at 18, and said sides are both curved in the same direction, so as to form propeller-blades for the revolving center piece, and by reason of this formation when the hook or spoon is drawn through the water the center piece is caused to revolve on the rod 15.

Pivotally connected with each side of the frame 5 is a hook 19, and the operation will be readily understood from the foregoing description when taken in connection with the accompanying drawing by all those familiar with this class of devices.

It will be understood that suitable bait may be placed upon the hooks 19, if desired, or this device may, as will be understood, be used without bait of any kind.

Mounted on the rod 15, at each end of the center piece 16, are spherical balls or bodies 20, which are also free to revolve on said rod, and the object of which is to center or properly locate the center piece 16 and to prevent the same from striking the sides or end portion of the frame 5.

It is evident that changes in the form of the parts of this device and in the construction thereof may be made without departing from the spirit of my invention or sacrificing its advantages, and I reserve the right to make all such alterations therein and modifications thereof as fairly come within the scope of the invention.

Having fully described my invention, I claim as new and desire to secure by Letters Patent—

1. The herein-described fishing device, consisting of an elliptical frame, which is pointed at each end, said frame being provided with a longitudinal rod, which is rigidly secured thereto, a revoluble center piece mounted thereon, the sides of which at the lower end thereof, are curved in the same direction, to form propeller-blades, said frame being also provided at its lower end with a hook or hooks, substantially as shown and described.

2. The herein-described fishing device, consisting of an elliptical frame, which is pointed at each end said frame being provided with a longitudinal rod, which is rigidly secured thereto, a revoluble center piece mounted thereon, the sides of which at the lower ends thereof, are curved in the same direction, to form propeller-blades, said frame being provided at its lower end with a hook or hooks, and at each side with a hook which is pivotally connected therewith, substantially as shown and described.

In testimony that I claim the foregoing as my invention I have signed my name, in presence of the subscribing witnesses, this 20th day of June, 1896.

DAVID McCARN KITTLE.

Witnesses:
W. G. WILLIAMS,
LEVI LENGS.